(12) United States Patent
Fan et al.

(10) Patent No.: US 11,439,207 B2
(45) Date of Patent: Sep. 13, 2022

(54) SMART BELT

(71) Applicants: BOE TECHNOLOGY GROUP CO., LTD., Wanchai (CN); BEIJING BOE DISPLAY TECHNOLOGY CO. LTD., Beijing (CN)

(72) Inventors: Likuan Fan, Beijing (CN); Peng Sun, Beijing (CN)

(73) Assignees: BEIJING BOE TECHNOLOGY DEVELOPMENT CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 792 days.

(21) Appl. No.: 15/743,253

(22) PCT Filed: Jul. 10, 2017

(86) PCT No.: PCT/CN2017/092352
§ 371 (c)(1),
(2) Date: Jan. 13, 2020

(87) PCT Pub. No.: WO2018/032905
PCT Pub. Date: Feb. 22, 2018

(65) Prior Publication Data
US 2020/0138149 A1 May 7, 2020

(30) Foreign Application Priority Data
Aug. 18, 2016 (CN) .......................... 201620900583.8

(51) Int. Cl.
*A44B 11/00* (2006.01)
*A41F 9/00* (2006.01)
(Continued)

(52) U.S. Cl.
CPC .............. *A44B 11/005* (2013.01); *A41F 9/00* (2013.01); *F21V 33/0008* (2013.01);
(Continued)

(58) Field of Classification Search
CPC .......... A44B 11/005; A41F 9/00; A41F 9/002; F21V 33/0008; G01C 21/20;
(Continued)

(56) References Cited

U.S. PATENT DOCUMENTS 6,157,890 A    12/2000  Nakai et al.

FOREIGN PATENT DOCUMENTS

CN           1825061 A        8/2006
CN         101750079 A        6/2010
(Continued)

OTHER PUBLICATIONS

International Search Report received for PCT Patent Application No. PCT/CN2017/092352, dated Oct. 10, 2017, 6 pages (2 pages of English Translation and 4 pages of Original Document).

*Primary Examiner* — Pei Yong Weng
(74) *Attorney, Agent, or Firm* — Womble Bond Dickinson (US) LLP

(57) ABSTRACT

The present disclosure relates to a smart belt including: a belt body; a belt buckle provided on the belt body; a GPS positioning mechanism for generating a traveling direction; and a rotatable direction indication mechanism for indicating the traveling direction; a drive mechanism for driving the direction indication mechanism to rotate to indicate the traveling direction according to the traveling direction given by the GPS positioning mechanism; and a light source used to project the traveling direction indicated by the direction indication mechanism onto the road surface. The beneficial (Continued)

effects of the present disclosure are: users' hands can be freed and the portability and convenience of navigation usage can be improved.

10 Claims, 3 Drawing Sheets

(51) Int. Cl.
| | |
|---|---|
| *G01C 21/20* | (2006.01) |
| *G01S 19/13* | (2010.01) |
| *G01C 21/12* | (2006.01) |
| *G01C 21/34* | (2006.01) |
| *F21V 33/00* | (2006.01) |
| *G01C 21/36* | (2006.01) |
| *G01S 19/14* | (2010.01) |
| *G06F 1/16* | (2006.01) |

(52) U.S. Cl.
CPC ............. *G01C 21/12* (2013.01); *G01C 21/20* (2013.01); *G01C 21/3407* (2013.01); *G01C 21/365* (2013.01); *G01S 19/13* (2013.01); *G01S 19/14* (2013.01); *G06F 1/163* (2013.01)

(58) Field of Classification Search
CPC .. G01C 21/3407; G01C 21/365; G01C 21/12; G01S 19/13; G01S 19/14; G06F 1/163; F21W 2111/00; G09F 19/18; G09F 23/00; G09F 27/005; A41D 1/002
See application file for complete search history.

(56) References Cited

FOREIGN PATENT DOCUMENTS

| | | |
|---|---|---|
| CN | 105661731 A | 6/2016 |
| CN | 205902853 U | 1/2017 |
| EP | 0886123 A2 | 12/1998 |

SMART BELT

CROSS REFERENCE TO RELATED APPLICATIONS

The present application is a 35 U.S.C. 371 national stage application of PCT International Application No. PCT/CN2017/092352, filed on Jul. 10, 2017, which claims the benefit of a Chinese Patent Application No. 201620900583.8 filed on Aug. 18, 2016, the contents of which are incorporated herein by reference in their entireties.

FIELD OF THE DISCLOSURE

The present disclosure relates to a wearable device, and more particularly to a smart belt.

BACKGROUND OF THE DISCLOSURE

With the gradual development of the technology of wearable devices, a series of smart devices such as smart bracelets, smart watches and smart glasses are well-known and accepted by more and more people. These smart devices make people's lives more convenient and healthier. Smart belt getting into people's lives is an inevitable trend. Currently, the main ways for navigation are mobile phone navigation, car navigation, and recently proposed flashlight navigation and the like. Mobile phone navigation and flashlight navigation are hand-held devices, which are not convenient when the user is holding other items by hand, and car navigation is not suitable for walking users.

SUMMARY OF THE DISCLOSURE

In order to solve the problem that mobile phone navigation devices, flashlight navigation devices and car navigation devices are not convenient for walking users or not suitable for walking users, the present disclosure provides a smart belt.

The smart belt includes:
a belt body; and
a belt buckle, which is provided on the belt body;
wherein the smart belt further includes:
a GPS positioning mechanism for generating a travel direction;
a rotatable direction indication mechanism for indicating the traveling direction, which is provided on the belt buckle;
a drive mechanism for driving the direction indication mechanism to rotate to indicate the traveling direction according to the traveling direction given by the GPS positioning mechanism;
a light source for projecting the traveling direction indicated by the direction indication mechanism onto the road surface.

Furthermore, the light source is disposed on a side of the direction indication mechanism close to the belt buckle.

Furthermore, the light source is disposed at a position higher than the position of the direction indication mechanism in a direction perpendicular to the road surface.

Furthermore, the direction indication mechanism includes:
a support structure having a cylindrical shape and its axial direction perpendicular to the main surface of the belt buckle, and having a receiving space in its central area;
a direction pointer which is located in the receiving space.

Furthermore, the direction indication mechanism further comprises:
a fixed dial having a scale, the fixed dial is stacked on a side of the support structure close to the belt buckle, and the fixed dial is coaxially arranged with the support structure.

Furthermore, there are 4 main scales and 4, 8 or 12 sub scales provided uniformly on the fixed dial.

Furthermore, the direction pointer comprises a fixed fulcrum pivoted on the support structure and a free end rotatable about the fixed fulcrum, wherein the fixed fulcrum is located at the axis of the support structure.

Furthermore, the drive mechanism includes:
a link gear capable of rotating the direction indication mechanism;
a drive gear capable of driving the link gear to rotate;
a motor that controls the drive gear to rotate; and
a transmission part connecting the motor and the drive gear.

Furthermore, the smart belt further includes a voice output mechanism that can output the traveling direction by voice.

Furthermore, it comprises a function key provided on the belt buckle, for controlling the on/off of the direction indication mechanism, the light source and/or the voice output mechanism.

The beneficial effects of the present disclosure are as follows: by displaying and projecting the traveling direction given by the GPS positioning mechanism using the direction indication mechanism and the projection light source, users' hands can be freed and the portability and convenience of navigation usage can be enhanced.

DETAILED DESCRIPTION OF THE DISCLOSURE

The features and principles of the present disclosure are described in detail below with reference to the accompanying drawings. The embodiments are merely used to explain the disclosure, and are not intended to limit the protection scope of the disclosure.

Figure 1:
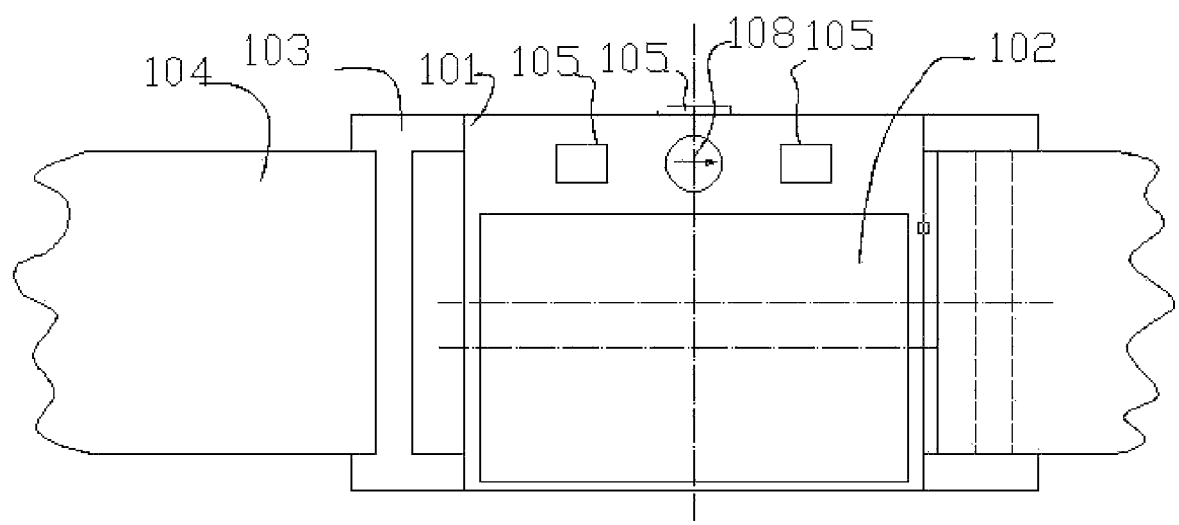
FIG. 1 shows a schematic structural view of a smart belt according to an embodiment of the present disclosure.
Figure 2:
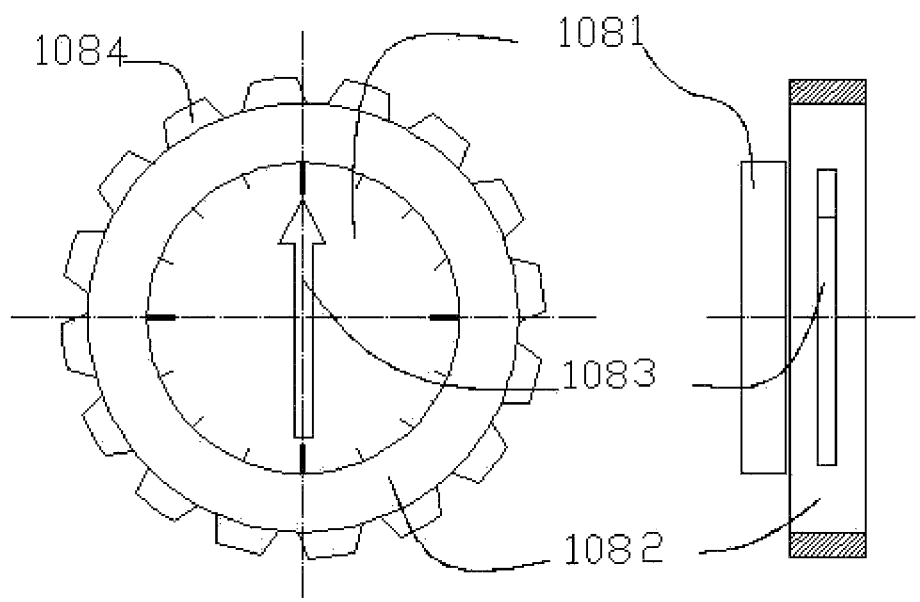
FIG. 2 shows a schematic structural view of a direction indication mechanism according to an embodiment of the present disclosure.

As shown in FIG. 1 and FIG. 2, this embodiment provides a smart belt, which includes a belt body 104 and a belt buckle 101 disposed on the belt body 104, and further includes:
- a GPS positioning mechanism provided on the belt body 104 or the belt buckle 101, which generates a traveling direction according to the current location of the user and the destination information input by the user.
- a rotatable direction indication mechanism 108 disposed on the belt buckle 101,
- a drive mechanism 302 for driving the direction indication mechanism 108 to rotate to indicate the traveling direction according to the traveling direction given by the GPS positioning mechanism;
- a light source 3012 which is configured to project the direction indication mechanism 108.

The arrangement of the smart belt in this embodiment can realize that the traveling direction given by the GPS positioning mechanism is displayed and projected by using the direction indication mechanism and the projection light source so as to free the user's hands and to enhance the portability and convenience of the usage of the smart belt. The displaying of the traveling direction given by the GPS positioning mechanism by projecting is simple and intuitive.

The provision of the light source 3012 frees the user's hands, and the user can intuitively obtain the navigation information through the projection of the traveling direction onto the road surface, which is simple and safe.

In this embodiment, the light source 3012 is disposed on a side of the direction indication mechanism close to the belt buckle so as to project the traveling direction indicated by the direction indication mechanism 108 onto the road surface.

In order to facilitate the projection of the direction indication mechanism 108 on the road surface, the light source 3012 is disposed at a position higher than the position of the direction indication mechanism 108 in the direction perpendicular to the road surface.

Figure 3:
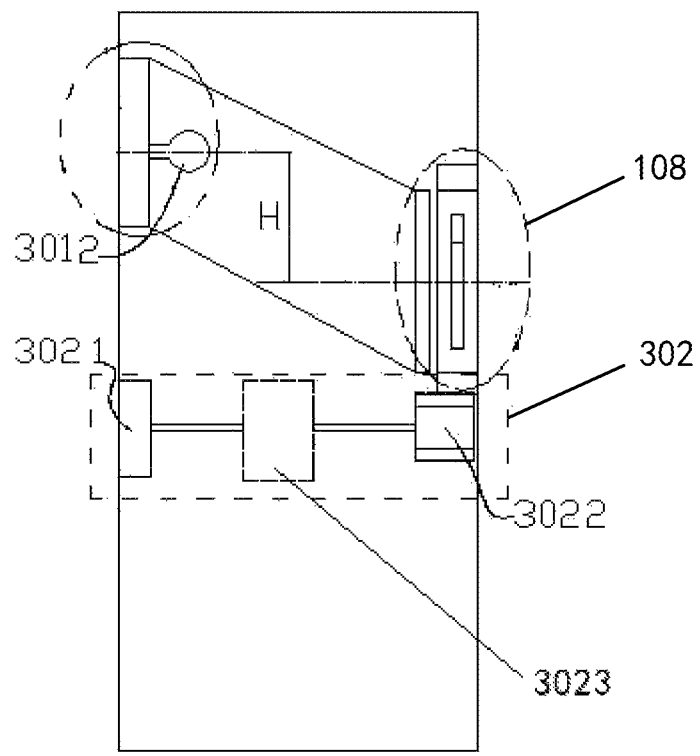
FIG. 3 shows a schematic structural view of a projecting mechanism according to an embodiment of the present disclosure.

As shown in FIG. 3, the position of the light source 3012 is higher than the position of the direction indication mechanism 108. "H" shown in FIG. 3 is the distance between the position of the light source 3012 and the position of the direction indication mechanism 108 in the direction perpendicular to the road surface. The purpose is to make the projection of the travelling direction effectively reach the road surface. The specific value of H can be set according to actual needs.

In this embodiment, the smart belt further includes a light passage disposed between the light source 3012 and the direction indication mechanism 108. The light emitted by the light source 3012 illuminates the direction indication mechanism 108 through the light passage so that the traveling direction indicated by the direction indication mechanism 108 can be projected onto the road surface. The light passage is designed so that the light source 3012 can only project the direction indication mechanism 108 without any other projection interfering with the projection of the travelling direction.

The specific structure of the direction indication mechanism 108 can have many forms, as long as it can indicate the traveling direction given by the GPS positioning mechanism. In this embodiment, the direction indication mechanism 108 includes:
- a support structure 1082 having a cylindrical shape and its axial direction perpendicular to the main surface of the belt buckle 101, and having a receiving space in its central area;
- a direction pointer 1083 which is located in the receiving space.

In this embodiment, the support structure 1082 is made of transparent material.

In this embodiment, the direction indication mechanism 108 further includes:
- a fixed dial 1081 having a scale, wherein the fixed dial 1081 is stacked on a side of the support structure 1082 close to the belt buckle 101, and the fixed dial 1081 is disposed coaxially with the support structure 1082.

The fixed dial 1081 is coaxially disposed with the support mechanism 1082 but is stationary with respect to the support mechanism 1082 and can aid the indication of the travelling direction. The fixed dial 1081 with a scale is more convenient for the user to obtain the traveling direction more accurately.

Further, the direction pointer 1083 includes a fixed fulcrum pivoted on the support structure 1082 and a free end rotatable about the fixed fulcrum, and the fixed fulcrum is located at the axis of the support structure 1082.

The direction pointer 1083 is at an angle to a reference scale of the fixed dial 1081, which is a included angle between the traveling direction generated by the GPS positioning mechanism and a reference direction (here, the reference direction is preset as north direction, but not limited thereto). There are total of four main scales and 4, 8, or 12 sub scales on the fixed dial 1081. The scale to which the direction pointer 1083 is pointed represents an included angle between the moving direction and the reference direction. For example: the direction where the direction pointer 1083 points to the 12 o'clock direction is a positive direction, and at this time the angle between the traveling direction and the reference direction is zero, the user can just go ahead. The direction where the direction pointer 1083 points to the 6 o'clock direction is an opposite direction, and the user needs to turn around.

As an option, the fixed dial 1081 is made of a transparent material.

In this embodiment, the drive mechanism 302 includes:
- a link gear 1084 capable of driving the direction indication mechanism 108 to rotate;
- a drive gear 3022 capable of driving the link gear 1084 to rotate;
- a motor 3021 that can control the drive gear 3022 to rotate;
- a transmission part 3023 connecting the motor 3021 and the drive gear 3022.

In this embodiment, the belt buckle 101 is made of metal material or organic material. The belt body 104 is connected to the belt buckle 101 through a connecting frame 103. One end of the connecting frame 103 is a fixed end and the other end is a free end, which facilitates the use of the waist belt.

In this embodiment, the smart belt further includes:
- a movement direction monitoring mechanism for monitoring user's movement direction;
- wherein the direction indication mechanism 108 is configured to indicate the correct traveling direction for the user according to the traveling direction generated by the GPS positioning mechanism and the current movement direction of the user.

When the direction indication mechanism 108 indicates the correct traveling direction for the user, the current movement direction of the user and the travelling direction generated by the GPS positioning mechanism are used to determine whether the movement direction of the user is correct, and prompt the user to enable the user to effectively reach the destination. The movement direction monitoring mechanism identifies the user's current movement direction and transmits the direction signal to the direction indication mechanism 108. The drive mechanism 302 drives the direction indication mechanism 108 to rotate according to the traveling direction generated by the GPS positioning mechanism and the user's movement direction. The direction pointer 1083 can be rotated with the direction indication mechanism 108. For example, if the traveling direction displayed by the direction indication mechanism 108 is left-turn 90 degrees, the direction pointer 1083 points to the 9 o'clock direction, and if the traveling direction indicated by the direction indication mechanism 108 is right-turn 90 degree, the direction pointer 1083 points to 3 o'clock direction. When the user is moving, if the user moves in the same direction as the traveling direction generated by the GPS positioning mechanism, the direction pointer 1083 points to the 12 o'clock direction (when the user's movement direction is the same as the traveling direction generated by the GPS positioning mechanism, the direction pointer 1083 may only indicate the traveling direction according to the traveling direction generated by the GPS positioning mechanism). If the movement direction of the user is opposite to the traveling direction generated by the GPS positioning mechanism, the direction pointer 1083 points to the 6 o'clock direction (the specific pointing direction of the direction pointer 1083 may be set according to actual needs). Then, the light source 3012 projects the traveling direction indicated by the direction indication mechanism 108 onto the road surface, and the user only needs to follow the direction indicated by the arrow on the road surface.

The specific structure of the movement direction monitoring mechanism may be in many forms, as long as it can monitor the movement direction of the user. In this embodiment, the movement direction monitoring mechanism includes:

a gyroscope for obtaining user steering information;
a velocimeter for obtaining user speed information;
a traveling direction obtaining structure for obtaining the movement direction of user based on the steering information and the speed information.

In this embodiment, the GPS positioning mechanism includes:

a memory for storing maps;
a GPS positioning unit for obtaining current location information of the user;
a path generating unit for generating a traveling direction based on the current location information and the destination information.

In this embodiment, the smart belt further includes a communication module for transmitting positioning information such as the current location information of the user and the traveling direction of the user given by the GPS positioning mechanism to a mobile terminal or a personal computer.

The communication module may enable the smart belt to be interconnected with a cell phone or a personal computer via a communication mode such as Bluetooth, WiFi or a USB interface.

The provision of the communication module can facilitate to store historical travel path information of the user so that it can be used to calculate the user's walking distance in order to analyze the user's exercise amount.

In this embodiment, the smart belt further includes a touch screen 102 disposed on the belt buckle 101. The touch screen 102 is used as a human-machine interface to facilitate user-machine interaction.

In this embodiment, the touch screen 102 may be a touch LCD (Liquid Crystal Display) or an OLED (Organic Light-Emitting Diode) screen for displaying maps.

In this embodiment, the smart belt further includes a voice output mechanism capable of outputting the traveling direction indicated by the direction indication mechanism 108 (the traveling direction may be a traveling direction given by the GPS positioning mechanism, or can be the correct traveling direction obtained in conjunction with the movement direction of the user monitored by the movement monitoring mechanism).

The traveling direction indicated by the direction indication mechanism 108 may be notified to the user through voice broadcast.

In this embodiment, at least one function key 105 provided on the belt buckle 101 is further included to control the on/off of the direction indication mechanism 108, the light source 3012 and/or the voice output mechanism.

The function key 105 is a mechanical key, and may also be a touch key, which is not limited herein.

Figure 4:
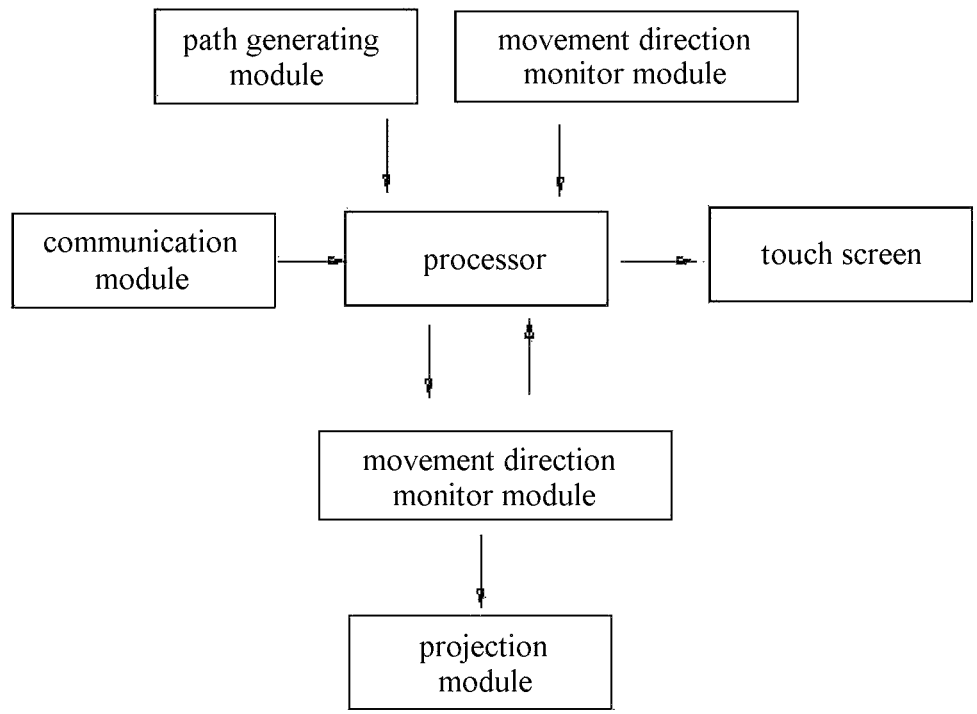
FIG. 4 shows a working principle of the smart belt according to an embodiment of the present disclosure.

FIG. 4 is a schematic diagram showing the working principle of the smart belt according to the present disclosure, which mainly includes a GPS positioning mechanism, a movement direction monitoring mechanism, a processor, a touch screen 102, a direction indication mechanism 108, a light source 3012 and a communication module etc. The GPS positioning mechanism, the communication module and the movement direction monitoring mechanism are all built in the processor. The movement direction monitoring mechanism is composed of a gyroscope, a velocimeter and a magneto-resistive chip etc., so as to identify the user's forward direction and turning movements. The communication module includes WiFi, Bluetooth, physical interface, etc., and can realize the interconnection with mobile phones, personal computers, so that the data can be uploaded and saved effectively.

Figure 5:
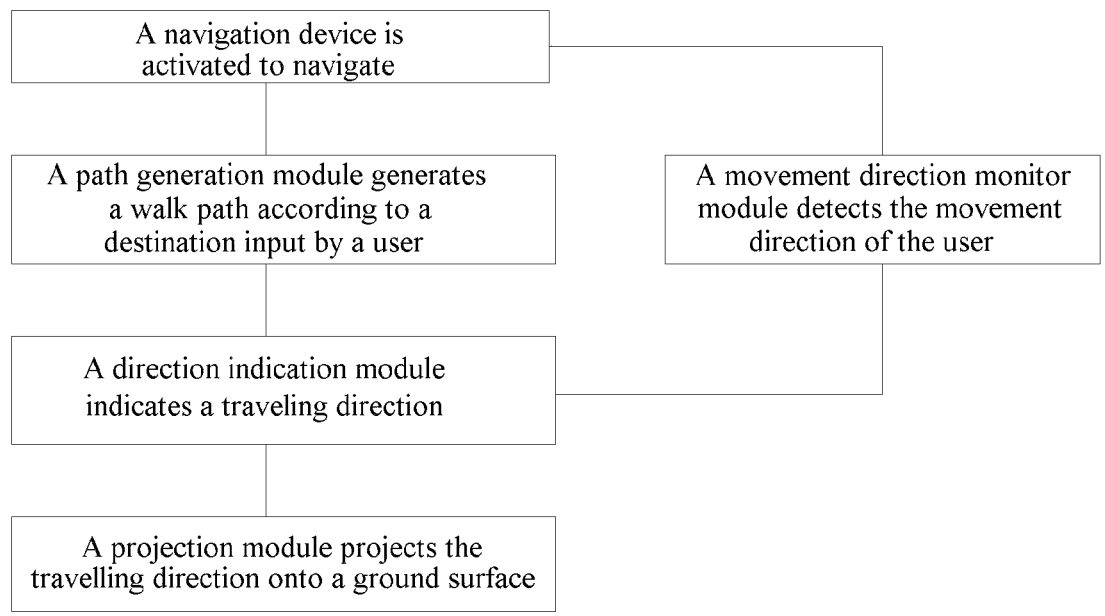
FIG. 5 shows an operational flowchart of a smart belt according to an embodiment of the present disclosure.

FIG. 5 is an operational flowchart of a smart belt according to the present disclosure. As shown in the figure, when the smart belt of the present disclosure is used, map navigation is activated on the touch screen 102 and a destination is selected to generate a traveling direction.

The direction indication mechanism 108 indicates direction according to the traveling direction given by the GPS positioning mechanism, the drive mechanism 302 drives the direction indication mechanism 108 to rotate and the direction indication mechanism 108 in turn drives the direction pointer 1083 to rotate; wherein, when the current traveling direction and the reference direction (the reference direction is preset as the north direction) is at an angle, for example, the traveling direction is the due south direction, that is, is at an angle 180° to the north, if turning left by 90 degree, it will point to the 9 o'clock direction; if turning right by 90 degrees, it will point 3 o'clock direction;

In order to ensure that the user can effectively reach the destination, the smart belt in this embodiment further includes a movement direction monitoring mechanism to identify the movement direction of the user and transmit the direction signal to the drive mechanism 302. At this time, the direction indication mechanism 108 indicate the user the correct traveling direction according to the traveling direction given by the GPS positioning mechanism and the current movement direction information, that is, comparing the traveling direction generated by the GPS positioning mechanism with the current movement direction of the user monitored by the movement direction monitoring mechanism to determine whether the user's movement direction is consistent with traveling direction given by the GPS positioning mechanism, and the result of the determination is indicated by the direction pointer 1083 to promptly inform the user when the user deviates from the correct traveling direction of the travel route. For example, if the movement direction of the user is opposite to the traveling direction given by the GPS positioning mechanism, the direction pointer 1083 points to the 6 o'clock direction. If the movement direction of the user is the same as the traveling direction given by the GPS positioning mechanism, the pointer points to the 12 o'clock direction.

Then, the light source 3012 is used to project the traveling direction indicated by the direction indication mechanism 108 onto the ground, and the user only needs to follow the directions of the arrow on the road surface.

It should be noted that the motor can be driven to rotate according to the traveling direction given by the GPS positioning mechanism (or the correct traveling direction for the user obtained according to the traveling direction given by the GPS positioning mechanism and the current movement direction monitored by the movement direction monitoring mechanism). The GPS positioning mechanism may be provided with an encoder at an output end thereof so that the signal output by the GPS positioning mechanism is converted into a control signal for controlling the rotation of the motor; or alternatively, a signal output by the GPS positioning mechanism is calculated using a preset algorithm to output a control signal to control the rotation of the motor.

It should be noted that, for those skilled in the art, a number of improvements and modifications may be made without departing from the principle of the disclosure. Those improvements and modifications should also be considered as falling within the scope of the present disclosure.

The invention claimed is:

1. A smart belt comprising:
   a belt body; and
   a belt buckle, which is provided on the belt body;
   wherein the smart belt further comprises:
   a GPS positioning mechanism for generating a travel direction;
   a rotatable direction indication mechanism for indicating the traveling direction, which is provided on the belt buckle;
   a drive mechanism for driving the direction indication mechanism to rotate to indicate the traveling direction according to the traveling direction given by the GPS positioning mechanism;
   a light source for projecting the traveling direction indicated by the direction indication mechanism onto a road surface.

2. The smart belt according to claim 1, wherein the light source is disposed on a side of the direction indication mechanism close to the belt buckle.

3. The smart belt according to claim 2, wherein the light source is disposed at a position higher than a position of the direction indication mechanism in a direction perpendicular to the road surface.

4. The smart belt according to claim 1, wherein the direction indication mechanism comprises:
   a support structure having a cylindrical shape and its axial direction perpendicular to a main surface of the belt buckle, and having a receiving space in its central area;
   a direction pointer which is located in the receiving space.

5. The smart belt according to claim 4, wherein the direction indication mechanism further comprises:
   a fixed dial having a scale, wherein the fixed dial is stacked on a side of the support structure close to the belt buckle, and the fixed dial is coaxially arranged with the support structure.

6. The smart belt according to claim 5, wherein there are 4 main scales and 4, 8 or 12 sub scales provided uniformly on the fixed dial.

7. The smart belt according to claim 5, wherein the direction pointer comprises a fixed fulcrum pivoted on the support structure and a free end rotatable about the fixed fulcrum, and the fixed fulcrum is located at an axis of the support structure.

8. The smart belt according to claim 1, wherein the drive mechanism comprises:
   a link gear capable of rotating the direction indication mechanism;
   a drive gear capable of driving the link gear to rotate;
   a motor that can control the drive gear to rotate; and
   a transmission part connecting the motor and the drive gear.

9. The smart belt according to claim 1, wherein the smart belt further comprises a voice output mechanism that can output the traveling direction by voice.

10. The smart belt according to claim 9, further comprising a function key provided on the belt buckle, for controlling on/off of the direction indication mechanism, the light source and/or the voice output mechanism.

* * * * *